Jan. 6, 1959  J. N. SHARMA  2,867,360
SELF-TIMING DISPENSER FOR VAPORIZABLE ORGANIC LIQUIDS
Filed Aug. 20, 1956
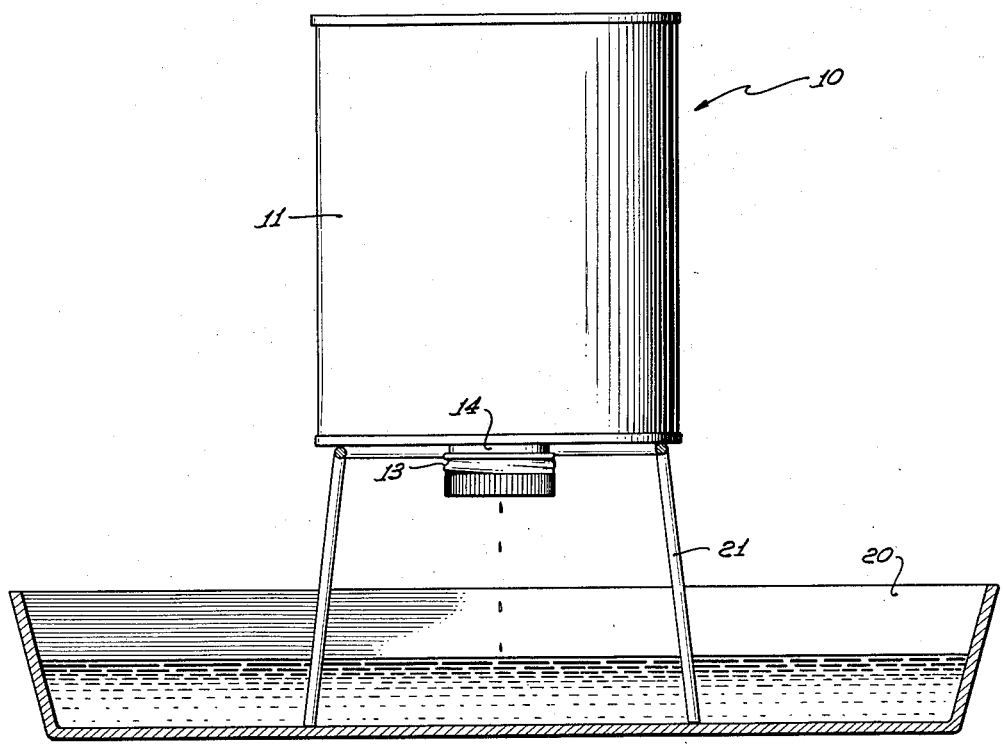
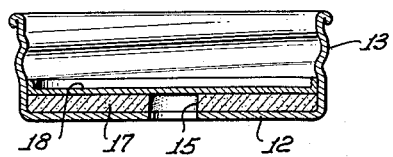
INVENTOR.
JAGAN N. SHARMA
BY
ATTORNEY.

United States Patent Office 2,867,360
Patented Jan. 6, 1959

2,867,360

SELF-TIMING DISPENSER FOR VAPORIZABLE ORGANIC LIQUIDS

Jagan N. Sharma, Venice, Calif., assignor to Zenith Processing Corporation, Venice, Calif., a corporation of California Application August 20, 1956, Serial No. 605,092

10 Claims. (Cl. 222—541)

This invention relates to a self-timing dispenser for vaporizable organic liquids having fungicidal and decay-inhibiting properties for treatment of fresh fruit and vegetables in storage and during shipment.

Fresh fruit and vegetables are subject to damage and destructibility by bacteria, mold, and other destructive organisms after gathering and before consumption. Inhibition of growth of such destructive organism during this period has been accomplished by surrounding the fruit with an atmosphere of a suitable fumigant comprising a vaporizable liquid having fungicidal and decay-inhibiting properties. Usually this treatment is made in a sealable compartment in a storage warehouse or in transit in a railway freight car, truck, or other vehicle.

In many instances fresh fruit and vegetables must be shipped a considerable distance to market and may be in transit for several days or more. Usually a freight car loaded with citrus fruit, for example, is subjected to treatment at time of departure by spraying and creating a mist within the car of the fungicide and a decay-inhibiting material to completely envelop the fruit to inhibit growth of destructive organisms so that the fruit will be in fresh, sound, marketable condition when the car arrives at its destination. If the car is in transit more than 48 hours, the effect of the original treatment may be dissipated and no longer effective to inhibit such growth. It is therefore very desirable to provide some means for treating the loaded car during shipment and usually about 48 hours after the original treatment.

Prior proposed devices for treating perishable fruit and vegetables in a freight car in transit have included various devices containing vaporizable organic liquids and valve means therefor which are actuated to open position by mechanical timing devices. Such prior proposed mechanical timing devices had numerous disadvantages as, for example, breakdown during shipment of the timing device and consequent non-release of the vaporizable liquid, and continuous maintenance and repair of such timing devices. Such prior devices were expensive and when subjected to rough handling, were easily damaged.

This invention contemplates a self-timing dispenser of simple construction and operation which does not utilize a mechanical timing arrangement. Essentially the invention contemplates the provision of a through-port in a container for a vaporizable decay and fungicidal liquid, said through-port being normally covered and sealed against leakage of contents of the container by a foil of metallic material. Within the container is provided a small quantity of acid immiscible with the vaporizable liquid and having a greater density than said liquid so that when the container is positioned with the through-port and foil cover at the bottom thereof, the acid is brought into contact with the foil so that after a predetermined time period the foil is dissolved or disrupted and release of the vaporizable liquid through the port commences.

Objects and advantages of the invention include that of an inexpensive self-timing dispenser which is simply placed in operation at the time of shipment; a dispenser which requires no special equipment and which is non-mechanical in its operation; and a dispenser which can be readily placed in use by modifying closure caps of existing containers so that expenditures for this device are reduced to a minimum.

One of the major objects of the invention is to disclose and provide such a self-timing dispenser wherein a metal foil and a small quantity of acid are utilized in the timing device, the character of the foil and the acid being selectively correlated so that disruption of the foil by the acid will occur after a preselected time period.

A still further object of this invention is to disclose and provide a self-timing dispenser which may be readily positioned and set in operation by inverting the same.

Various objects and advantages of this invention will be readily apparent from the drawing in which an exemplary embodiment is shown.

In the drawings:

Fig. 1 is an elevational view of a container embodying this invention in inverted operative position.

Fig. 2 is a sectional view of a removable closure for said container and embodying this invention.

A self-timing dispenser of this invention is generally indicated at 10 in the drawings, said dispenser 10 including a hollow container 11 which may be of conventional form, shape, size and volume and may be made of any suitable material, such as metal. The size of the container depends upon the quantity of vaporizable liquid required for treating a storage chamber such as a freight car.

The container 11 may be provided with a removable closure cap 12 of suitable metallic material. The cap 12 includes a threaded portion 13 for threadedly connecting the cap to a threaded neck 14 on the container. The cap 12 may be provided with a through-port 15 extending through its transverse wall and a circular gasket 17 seated within the cap against said wall.

A metallic foil 18 is positioned on the gasket 17 and provides a sealable cover for through-port 15, said foil 18 being of circular form and having circumferential margins positioned against threaded portion 13. The metallic foil 18 thus normally provides a gas-tight, fluid-tight cover for port 15 and prevents escape of the contents of the container by vaporization. The thickness of the foil may vary from .0007" to .005", for example, the thickness selected depending upon the time required to dissolve the foil.

For treatment of fresh fruit and vegetables during storage and transit, various suitable fumigants and vaporizable organic liquids having fungicidal and decay inhibiting properties may be used in container 11. Such organic liquids may comprise ethylene dichloride, carbon tetrachloride, perchlorethylene and trichlorethylene and the like. It is understood that ethylene dichloride may be used by itself or in combination with other organic volatile liquids such as carbon tetrachloride.

A container 11 filled with a selected fumigant, such as mentioned above, may be charged with a small quantity, for example, 1 to 10 cc. of an acid such as sulfuric acid. The acid selected should be immiscible with the selected vaporizable organic liquid. Also the selected acid should have a different specific gravity than that of the selected fumigant so that when container 11 is charged with said acid, the acid will seek a predetermined position in the container and with respect to the contents of the container. Preferably the acid may be heavier than the organic liquid so that it will tend to settle toward the lowermost portion of the container. The acid may be introduced into a container just prior to the time of departure of a rail car and may be placed in the car just before sealing of the car. It is understood the car is treated with a fumigant at the time of departure.

When the container charged with acid is placed in a freight car, the container is inverted and may be positioned on a simple wire frame 21 resting in a tray 20 of suitable material. The wire frame and tray are exemplary only; it is understood that any suitable means may be used to hold the container in a selected position.

Inverting of the container positions the metal foil and closure cap at the lowermost portion of the container and the acid, the specific gravity of which is greater than that of organic liquid will settle to and contact the foil. The acid begins to dissolve the foil and after a preselected time period, dependent upon the thickness of the foil and the character of the acid, the foil is disrupted so as to open port 15 and the liquid contents will commence to discharge therethrough.

Flow of liquid through port 15 may be facilitated by punching a small vent hole in the upper portion of the container after inverting the container.

It will thus be readily understood by those skilled in the art that an inexpensive, fool-proof, non-damageable self-timing dispenser has been provided for automatically re-gassing or re-treating perishable fruit and vegetables with a fungicidal and decay-inhibiting volatile organic liquid after a predetermined time period.

It is understood that while the through-port is illustrated and shown in a removable cap, such a through-port may be provided in any portion of the container and the container selectively positioned so that the acid will come into cooperable contact with the foil covering the throughport for dissolving the foil. While the timing dispenser has been described with respect to the treatment of fruit and vegetables in a railway car, it is understood that such a timing device may be utilized in warehouses where such fruit and vegetables are stored.

All modifications and changes coming within the scope of the appended claims are embraced thereby.

I claim:

1. A self-timing dispenser for vaporizable organic liquids having fungicidal and decay inhibiting properties, comprising: a metallic container provided with a removable closure in its top; a through port in said closure; a normally gas-tight metallic foil between the port in said closure and container contents; a body of organic vaporizable liquid in said container and a small quantity of acid within said container, said acid having a greater density than said organic liquid and being immiscible with the organic liquid, the quantity of acid and the character of the metal foil being correlated to effect disruption of the foil by said acid within a predetermined period of time when said container is inverted, to liberate said organic liquid through the port in said closure at such predetermined time.

2. A self-timing dispenser for vaporizable organic liquids having fungicidal and decay inhibiting properties, comprising: a metallic container provided with a removable closure in its top; a through port in said closure; a normally gas-tight metallic foil carried by the closure and having a surface exposable to the container contents; and a body of organic vaporizable liquid in said container and a small quantity of acid within said container, said acid having a greater density than said organic liquid and being immiscible with the organic liquid, the quantity of acid and the thickness of said foil being correlated to effect disruption of the foil by said acid within a predetermined time period when said container is inverted, to liberate said organic liquid through the port in said closure.

3. A self-timing dispenser for vaporizable organic liquids having fungicidal and decay inhibiting properties, comprising: a container provided with a removable closure, said closure having a through port; a metallic foil carried by said closure covering and sealing said port; and a body of organic vaporizable liquid in said container and a small quantity of acid within said container, said acid being immiscible with the organic liquid and having a greater density than said liquid, said acid and the character of said foil being correlated to effect disruption of the foil by said acid within a predetermined period of time when said container is positioned with the closure at the bottom thereof to liberate said organic liquid through the port in said closure.

4. A self-timing dispenser for vaporizable organic liquids for treatment of fresh fruits and vegetables, comprising: a container provided with a through port; a normally gas-tight metallic foil covering said through port; and a vaporizable liquid in said container and a small quantity of acid within said container, said acid being immiscible with said liquid and normally out of contact with said foil, the character of the acid and of the metal foil being correlated to effect disruption of the foil by said acid within a predetermined period of time when the position of the container is changed to bring the acid and foil into contact.

5. A timing device for releasing contents of a container after a preselected time period comprising, in combination: a container having fluid to be released; means providing a through port in said container; means including a fluid-tight metal foil cover for said port; and means for disruption of said foil cover including an acid immiscible with said fluid and having a greater density than said fluid for disruption of said cover when said container is selectively positioned to bring said acid into contact with said cover.

6. A timing device as stated in claim 5 wherein said foil cover and said acid are correlated to delay disruption of said cover to a preselected time period.

7. A timing device for releasing fluid contents of a container after a preselected time period comprising, in combination: a container having fluid to be released; means providing a through port in said container; means including a fluid-tight cover for said port; and disruption means for said cover within said container operative to breach said cover after a preselected time period when said container is selectively positioned to bring said disruption means into contact with said cover.

8. A timing device for releasing fluid contents of a container after a pre-selected time period comprising, in combination: a container having fluid to be released; means providing a through port in said container; means including a fluid tight cover for said port; and disruption means for said cover within said container including an acid immiscible with said fluid and having a greater density than said fluid operative to breach said cover after a pre-selected time period when said container is selectively positioned to bring said disruption means in contact with said cover.

9. A timing device for releasing contents of a container after a pre-selected time period comprising, in combination: a container having fluid to be released; means providing a through port in said container; means including a fluid tight cover for said port; and means within said container having a greater density than and immiscible with said fluid for disruption of said cover when said container is selectively positioned to bring said disruption means into contact with said cover.

10. The combination set forth in claim 9 wherein said last mentioned means is a fluid.

References Cited in the file of this patent

UNITED STATES PATENTS

| | | |
|---|---|---|
| 1,831,476 | Bennett | Nov. 10, 1931 |
| 1,898,073 | Woodberry | Feb. 21, 1933 |
| 2,244,302 | Lynn et al. | June 3, 1941 |
| 2,759,768 | Sato | Aug. 21, 1956 |